Feb. 17, 1959   E. P. WIGNER ET AL   2,874,307
REACTOR SHIELD

Filed Jan. 9, 1947   2 Sheets-Sheet 2

Inventors:
Eugene P. Wigner
Leo A. Ohlinger
Gale J. Young
Alvin M. Weinberg
By Robert A. [signature]
Attorney

United States Patent Office 2,874,307
Patented Feb. 17, 1959

2,874,307

REACTOR SHIELD

Eugene P. Wigner, Oak Ridge, Tenn., Leo A. Ohlinger, Los Angeles, Calif., and Gale J. Young and Alvin M. Weinberg, Oak Ridge, Tenn., assignors to the United States of America as represented by the United States Atomic Energy Commission Application January 9, 1947, Serial No. 721,064

2 Claims. (Cl. 250—108)

This invention relates to neutronic reactors, particularly to a reactor shield and is a continuation-in-part of Wigner et al. Patent 2,770,591, dated November 11, 1956.

As is more fully described in said copending application, it is necessary to provide suitable shielding for neutronic reactors and the types of shields most commonly used are water cooled. Certain problems are presented in connection with effectively cooling shields of the water cooled type. One problem arises from the fact that the activity of a neutronic reactor and consequently the heat produced thereby has the greatest effect on a shield in the portion thereof adjacent the reactor, which effect decreases progressively outwardly from the adjacent portion. As a result the shield heats unevenly. The distribution of coolant to the shield in accordance with the teachings of the present invention is proportioned in accordance with this fact so that efficient cooling is obtained.

Another problem arises in connection with radiation activity created in the cooling water which necessitates careful handling of the water in order that personnel are protected. From this standpoint it would be desirable to segregate the highly contaminated water from the uncontaminated or less contaminated water.

It is one of the principal objects of the present invention to distribute coolant to the different portions of a shield more nearly in a direct proportioned relation to the application of heat to the shield so that the temperature of the shield may be kept more nearly uniform and the cooling efficiency is increased.

An equally important object is to segregate the shield cooling water most intimately associated with the reactor from that in the more remote portions of the shield so that any contamination may be confined to a smaller portion of the cooling water and handled more economically.

More specifically, the present invention is to provide a differential shield having a plurality of compartments through each of which coolant may be circulated independently of the others, whereby the rate of removal of heat from different portions of the shield may be controlled independently and the water from each portion handled separately.

Another object is to cool various portions of the shield separately and handle the cooling water thereof in accordance with the intensity of the neutrons and gamma rays to which the portions are subjected, respectively.

Another object is to supply more coolant to the portion of the shield immediately adjacent the reactor than to the portions farther removed from the reactor.

Other objects and advantages will become apparent from the following description wherein reference is made to the drawings in which.

In neutronic reactors a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general, such reactors comprise bodies of compositions containing such fissionable material, for example, natural uranium disposed in a neutron slowing material which slows the neutrons to thermal energies. Such a slowing material is termed a neutron moderator. Carbon and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in Fermi et al. Patent 2,708,656, dated May 17, 1955.

It is recognized, of course, that other reactors than that described in the parent case and those described in the Fermi et al. patent may have employed therewith a shield embodying the principles of the present invention.

Figure 1:
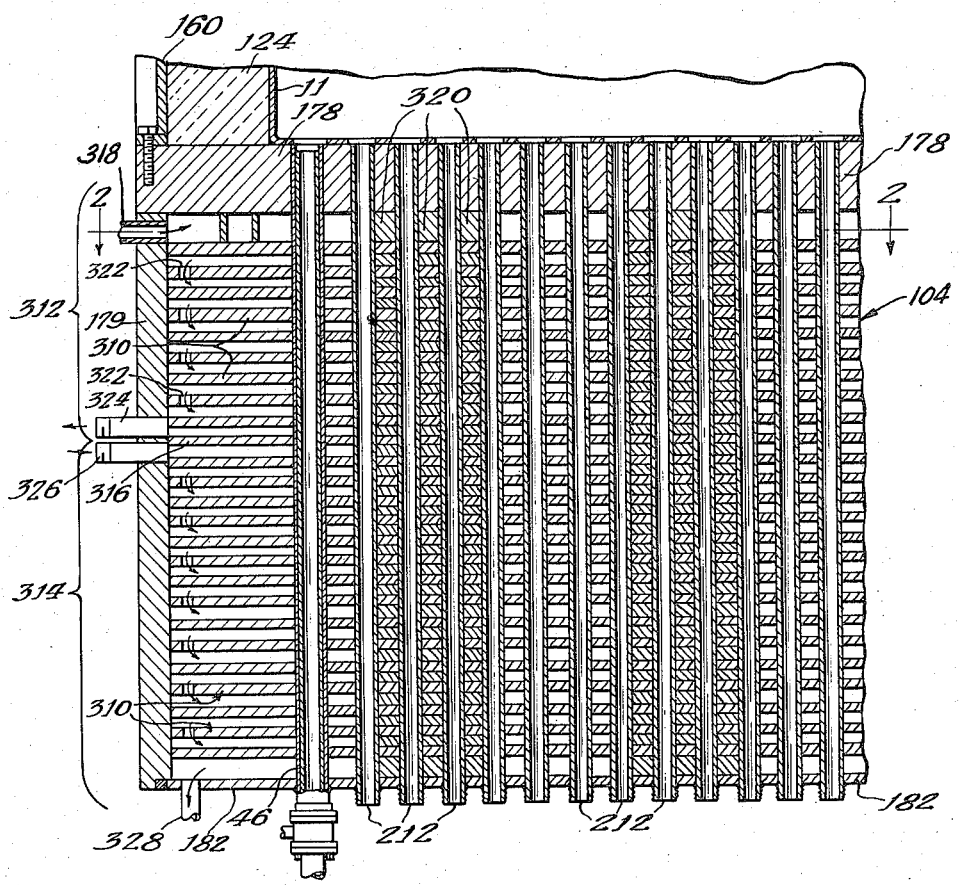
Fig. 1 is a sectional view, partly in elevation, of a portion of a neutron and gamma ray shield showing a portion of the associated reactor and is taken on line 1—1 of Fig. 2.
Figure 2:
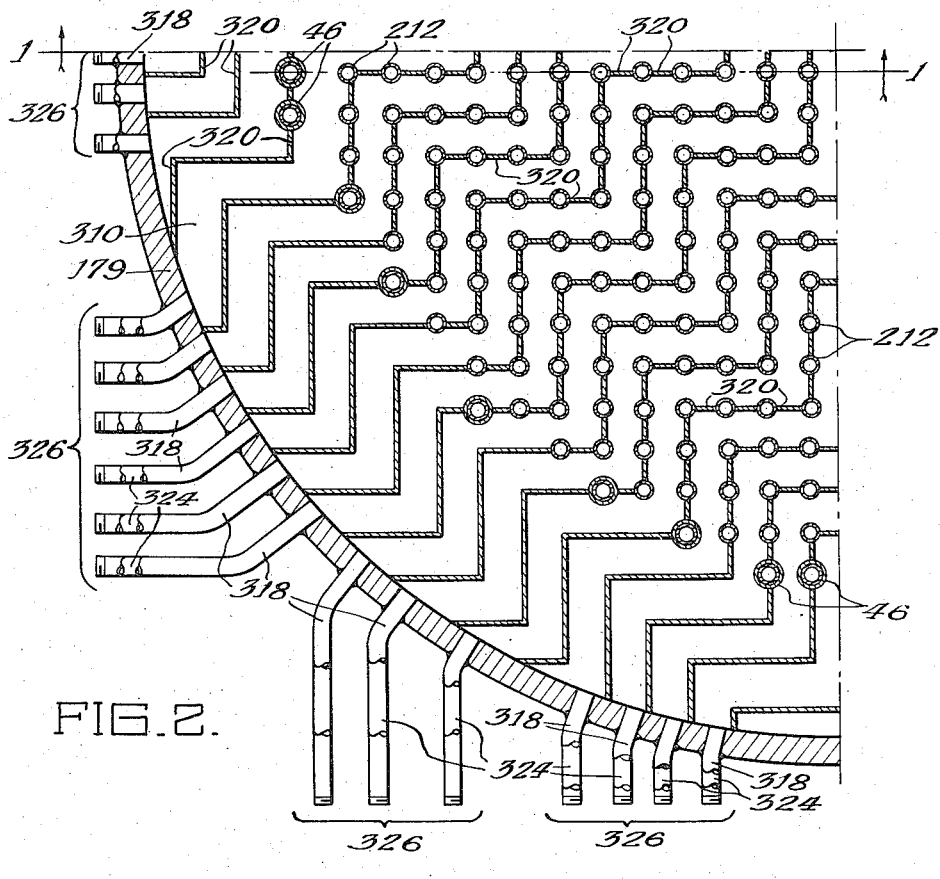
Fig. 2 is a sectional view, partly in plan, taken through the portion of the neutron and gamma ray shield of Fig. 1 and is taken on line 2—2 of Fig. 1.

Referring to Figs. 1 and 2, the bottom of a reactor tank 11 is shown supported by a neutron and gamma ray shield generally designed 104, which is constructed in accordance with the teachings of the present invention. It is to be understood that the shield 104 can be disposed above a reactor, or otherwise in relation to its associated reactor.

Figure 3:
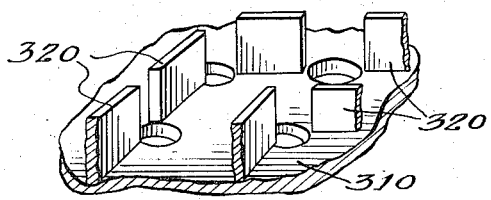
Fig. 3 is a fragmentary perspective view of a portion of the structure shown in Fig. 2.

The neutron and gamma ray shield 104 is constructed of alternate layers of neutron slowing and neutron absorbing material, these materials likewise serving as gamma ray absorbers. The shield 104 is of circular horizontal cross section and in one embodiment is five feet in thickness and includes twenty-five steel plates 310 each of which is one inch thick. The plates 310 are separated from one another approximately one inch in the vertical direction. The shield 104 is divided into a plurality of sections, such as two sections 312 and 314, by one of the plates 310 as shown at 316. The upper section 312 of the shield includes nine plates and the lower section 314 includes fifteen plates, the plate at 316 being common to both sections. One purpose of dividing the shield unequally is to provide more cooling for the upper section adjacent the reaction tank 11 where the neutron and gamma ray absorption is relatively high. The shield may, of course, be divided into more than two sections. It is preferred to introduce cool water into the upper section through a series of inlet pipes 318. Water introduced through the inlet pipes 318 is circulated across the shield between the top member 178 and the uppermost plate 310 through channels formed by the said member and plate and guide vanes or baffles 320 (Figs. 2 and 3) which extend between tubes 212 (Fig. 1), that pierce the shield 104 for introduction of a coolant to the reactor tank 11 and emergency pipe lines 46 for dumping heavy water. The guide vanes or baffles 320 between the top plate 310 and the top member 178 extend from between inlet pipes 318 to the opposite side of the shield shell 179. Apertures (not shown) are provided in the uppermost plate 310 opposite the inlet pipes 318 and communicate with the space formed below by the top one of the plates 310 and the next lower one of the plates 310. A similar aperture 322 is located in the next lower plate 310 underneath the inlet 318. Apertures 322 alternate between ends of the channels formed between the plates 310 by the guide vanes 320, causing the cooling water to flow back and forth over the shield plates, the heated water being removed at outlets 324. The plate designated 316 is unapertured and forms a circulation barrier between the upper and lower sections of the shield 104. The lower section of the shield 104 is similarly constructed of plates alternating with water spaces, the channels extending between similar inlets 326 and outlets 328, the outlets 328 piercing the lowest plate 182 adjacent and about a portion of the periphery thereof. Each of the channels through which the water flows across the circular shield 104 follows a zig-zag course, its general direction however being chordal. The longest channel extends substantially through the center of said shield. Corresponding wall portions of contiguous channels are parallel to each other. The differential cooling of the shield may be accomplished by providing a greater flow of coolant through one portion or by unequal division of the shield, as shown and described.

By dividing the shield in the manner just described, any radioactivity induced in the cooling water in the shield portion adjacent the reactor 10 is removed with the water discharge through the pipes 324 without contaminating the cooling water in the lower outer shield portion. Thus, the outermost layer of the shield is kept relatively free from radioactivity.

Having thus described the invention, what is claimed is:

1. A shield for a neutronic reactor comprising a plurality of substantially flat parallel plates, a plurality of tubes passing through said plates, and cooling water channels between said plates defined by vanes extending from tube to tube across said plates.

2. A shield for a neutronic reactor comprising a peripheral shell, a plurality of substantially parallel separated metal plates within said shell, tubes extending through said plates, a plurality of cooling water inlet pipes extending through said shell between two of said plates, a series of channels extending from between said inlet pipes and from tube to tube across said two plates, and an outlet communicating with the space between said two of said plates whereby a fluid is directed across said shield for cooling thereof.

References Cited in the file of this patent
UNITED STATES PATENTS

| | | |
|---|---|---|
| 452,607 | Hunt | May 19, 1891 |
| 2,238,036 | Clutts | Apr. 15, 1941 |
| 2,252,605 | Wick et al. | Aug. 12, 1941 |

FOREIGN PATENTS

| | | |
|---|---|---|
| 861,390 | France | Oct. 28, 1940 |
| 233,011 | Switzerland | Oct. 2, 1944 |